INVENTOR.
Walter B. Kirk
BY
Frank E. Miller
ATTORNEY

Patented Nov. 21, 1950

2,531,055

UNITED STATES PATENT OFFICE 2,531,055

BRAKE APPARATUS

Walter B. Kirk, East McKeesport, Pa., assignor to The Westinghouse Air Brake Company, Wilmerding, Pa., a corporation of Pennsylvania Application December 23, 1947, Serial No. 793,567

7 Claims. (Cl. 188—107)

This invention relates to brake apparatus and more particularly to the fluid pressure controlled type such as employed on railway vehicles.

One object of the invention is the provision of an improved fluid pressure controlled brake apparatus which will operate to effect braking of a vehicle even though the fluid pressure should fail.

Another object of the invention is to provide an improved fluid pressure controlled brake apparatus adapted to provide different degrees of braking of a vehicle as required under different conditions such as in usual or emergency conditions or when empty and loaded.

Another object of the invention is to provide an improved fluid pressure controlled brake apparatus adapted to function for stopping a vehicle and for subsequently holding the vehicle stopped with the apparatus void of fluid under pressure.

Still another object of the invention is to provide an improved fluid pressure controlled brake apparatus adapted to be used as a parking brake on a vehicle and which may be released mechanically.

The above objects are realized by provision of a brake cylinder device embodying a piston arranged to be operated by fluid under pressure for applying brakes in combination with a brake cylinder device embodying another piston arranged to be operated by spring means for applying brakes, through the medium of a brake cylinder lever common to both pistons. The brake cylinder lever may be actuated by either or both of the brake cylinder pistons for applying brakes on the vehicle, and said lever is provided with means whereby it may be manually broken to effect release of the spring applied brake should it be desired to do so when there is no fluid under pressure on the vehicle.

Other objects and advantages will become apparent from the following more detailed description of the invention.

Figure 1:
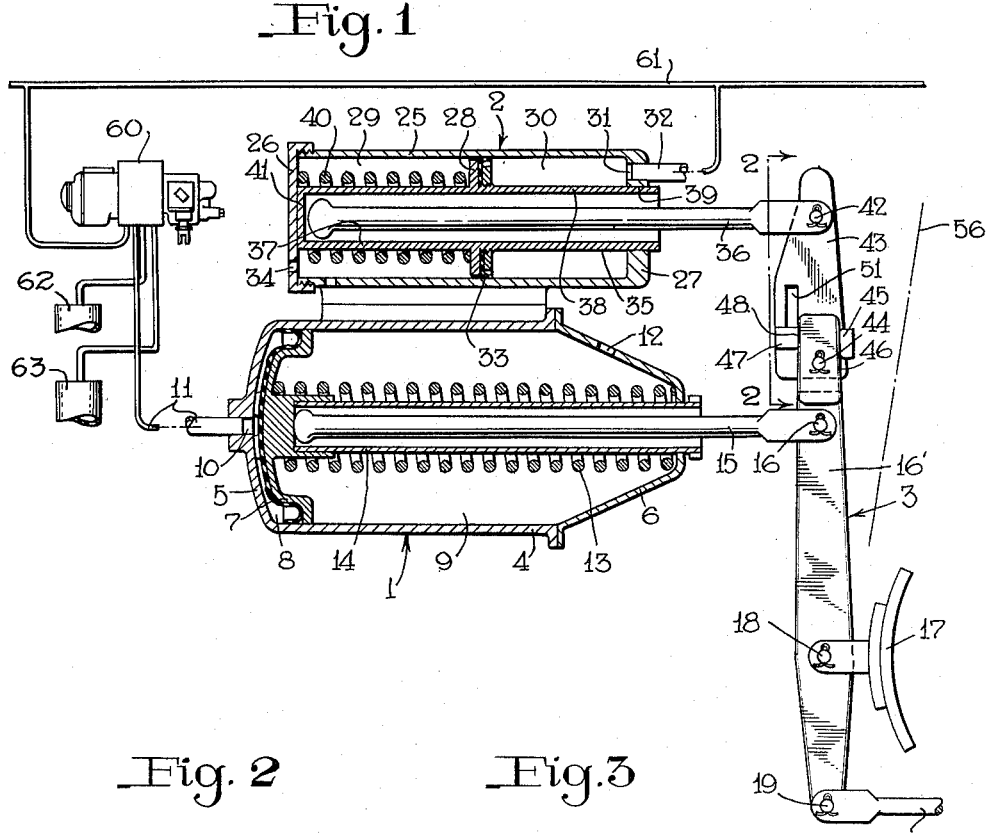
Figure 2:
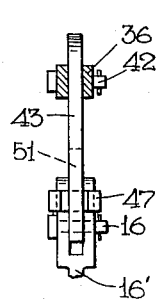
Figure 3:
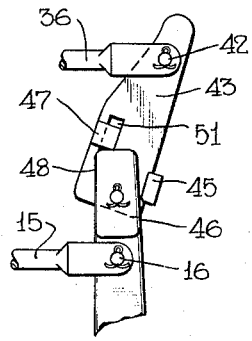

In the accompanying drawing, Fig. 1 is a diagrammatic sectional view, partly in outline, of the improved fluid pressure controlled brake equipment; Fig. 2 is a view of a portion of a brake cylinder lever taken along the line 2—2 in Fig. 1 and showing the lever in locked position; and Fig. 3 is a view of the same portion of the brake cylinder lever in Fig. 1, but shown in its unlocked or released position.

Referring to Fig. 1 in the drawing, the improved fluid pressure controlled brake equipment comprises two brake cylinder devices 1 and 2 operatively connected to a brake cylinder lever 3 which is common to both.

The brake cylinder device 1 comprises a hollow cylindrical casing 4 closed at one end by an integrally formed pressure head 5 and at its opposite end by a non-pressure head 6 clamped thereto. A brake cylinder piston 7 is slidably mounted in the casing, defining within said casing a pressure chamber 8 with the head 5 on its one side and a non-pressure chamber 9 with the head 6 on its opposite side. The pressure chamber 8 is adapted to be supplied with fluid under pressure by way of a port 10 opening through the pressure head 5 to actuate the piston 7 in the direction of the non-pressure chamber 9 for applying brakes on a vehicle in the well-known manner, as will become obvious from further description. The port 10 is connected to a brake cylinder pipe 11.

A port 12 is provided in the non-pressure head 6 which opens the non-pressure chamber 9 to atmosphere, and a compression return spring 13 is disposed in said chamber in the usual manner between the piston 7 and said head for urging said piston in the direction of the pressure chamber 8 toward and to its release position in which it is shown in the drawing. Also in the usual manner, a hollow piston rod 14 is secured for movement with the piston 7 and extends through the non-pressure chamber 9 and a central bore in the non-pressure head 6 to accommodate the usual push rod 15 which projects therein. One end of the push rod 15 is rounded for contact with the piston 7, while its opposite end is operatively connected by means of a pin 16 to a portion 16' of the brake cylinder lever 3.

A brake shoe member 17 may be carried by the lever 3 connected by a pin 18 thereto for braking engagement with a wheel (not shown) of a vehicle employing the equipment. The lever 3 may be pivotally connected at its lower end by means of a pin 19 to a pull rod 20, so that as said lever is actuated by outward movement of the push rod 15 through action of fluid under pressure in chamber 8 on the brake cylinder piston 7, said lever will rock in a clockwise direction about pin 19 to bring the brake shoe 17 into contact with the wheel, whereupon pin 19 will act as a fulcrum for said lever to effect application of a braking force by said shoe to said wheel.

The brake cylinder device 2 comprises a hollow cylinder casing 25 which is fixed relative to the brake cylinder device 1 preferably by mounting said casing on top of the brake cylinder device 1 and securing it thereto, as shown in the drawing. The casing 25 is closed at one end by a non-pressure head 26 removably secured thereto, and is closed at its opposite end by a pressure head 27 which may be formed integrally therewith. A piston 28 is slidably mounted within the casing 25, dividing the interior thereof into a non-pressure chamber 29 at its one side closed by the non-pressure head 26 and a pressure chamber 30 at its opposite side closed by the pressure head 27. The pressure chamber 30 is adapted to be supplied with fluid under pressure by way of a port 31 in the pressure head 27, and said port is in turn connected to a pipe 32. A sealing ring 33 is carried by the piston 28 for slidable sealing engagement with the inner wall of casing 25 to prevent leakage of fluid under pressure from the pressure chamber 30 past said piston into the non-pressure chamber 29 which is open to the atmosphere via a port 34 opening through the non-pressure head 26.

An actuating or brake applying spring 40 is disposed in the non-pressure chamber 29, interposed between the non-pressure head 26 and the piston 28 for, upon release of fluid under pressure from chamber 30, actuating said piston in the direction of pressure chamber 30 to effect application of brakes on the vehicle, either independently or with the brake cylinder device 1, as will be described hereinafter. The actuating spring 40 is adapted to be normally held in compression by pressure of fluid in pressure chamber 30 acting on the piston 28, which piston is thereby held in a release position against action of said spring, in which position it is shown in the drawing. A hollow piston rod 35, integrally secured to the piston 28 and extending from opposite sides thereof, is provided for accommodating a push rod 36. One portion 37 of the piston rod 35 projects in the direction of the non-pressure head 26, while an opposite portion 38 extends outwardly through a central bore 39 in the pressure head 27. The projecting end of portion 37 of rod 35 is held in contact with the inner face of the non-pressure head 26 by action of pressure of fluid normally present in pressure chamber 30, as above described, and thereby defines the release position of the piston 28 and determines the degree to which the actuating spring 40 may be compressed. An end wall 41 is provided which closes the projecting end of the hollow piston rod 35 for engagement with a rounded end of the push rod 36 the opposite end of which is pivotally connected by means of a pin 42 to the upper end of a portion 43 of the brake cylinder lever 3.

During operation of the brakes by either one or both of the brake cylinder devices 1 and 2, the portions 43 and 16' of the brake cylinder lever 3 are connected one with the other to act as a single member. If only one brake cylinder device is operated at a time, the push rod of the brake cylinder piston remaining in its release position being free to slide within the respective hollow piston rod into which it extends, will move with movement of the brake cylinder lever 3 in either direction.

The brake cylinder device 2 may be employed in a manner such that spring 40 will aid pressure of fluid in the brake cylinder device 1 to apply brakes during certain operating conditions of the vehicle, as for one example, to aid in effecting an emergency application of the brakes, or to aid in effecting adequate braking under extreme load conditions, or still further, it may be employed by itself to apply the brakes on a vehicle for parking. One, several, or all of the above functions may be incorporated in a single brake system by provision of the necessary controls for controlling and correlating pressures of fluid in the pressure chambers 8 and 30 in brake cylinder devices 1 and 2, respectively, to obtain the results desired. The improved brake equipment might be employed in a brake system in such a manner that upon accidental reduction in pressure of fluid in chamber 8 in the brake cylinder device 1, an otherwise unintended release of the brakes on the vehicle could be prevented by automatic venting of fluid under pressure from chamber 30 in the brake cylinder device 2.

For example, operation of the brake cylinder device 1 may be controlled by a brake controlling valve device 60, such as the well known AB valve device, disclosed and described in detail in United States Patent No. 2,031,213, issued to C. C. Farmer, February 18, 1936 in response to variations in pressure of fluid in a brake pipe 61 extending from end to end of the vehicle and normally charged with fluid under pressure from a source of fluid under pressure on the locomotive not shown). In the usual manner, in response to a reduction in pressure of fluid in the brake pipe 61, corresponding to a service or emergency reduction, the valve device 60 will respond to effect supply of fluid at the proper pressure from the auxiliary reservoir 62 or/and the emergency reservoir 63, charged previously with fluid under pressure from the brake pipe 61, to the pressure chamber 8 in the brake cylinder device 1 for effecting a service or emergency application of the brakes in accord with said reduction in brake pipe pressure. Conversely, also in the usual manner, the valve device 60 will respond to subsequent increases in pressure of fluid in the brake pipe 61 to effect reductions in pressure of fluid in the pressure chamber 8 in brake cylinder device 1 for effecting release of the brakes, or reduction in braking force, according to degree of said increase in brake pipe pressure. By connecting the pipe 32 to the brake pipe 61, pressure of fluid in chamber 30 in the brake cylinder device 2 at all times will equal that in the brake pipe 61, so that the normal pressure of fluid carried in the brake pipe 61 and hence in chamber 30 will maintain the device 2 in its release position. The required degree of reduction in pressure of fluid in the brake pipe 61, hence in chamber 30, necessary to allow the spring 40 to move piston 28 is determined by the size of said piston and the initial resultant compression of said spring, and by proper proportioning of the two, said required degree may be varied. It will be appreciated that once the spring is rendered effective to move the piston 28 and rod 35 into engagement with push rod 36, the force available from said spring for delivery to said rod will depend upon the degree of further reduction in pressure of fluid in the brake pipe 61, hence in chamber 30. It will be seen that the brake cylinder device 2 can be arranged for operation to aid the brake cylinder device 1 during service applications and emergency applications of the brakes or it may be restricted to operate only during emergency applications. In either case, the force available for brake application by both the brake cylinder device 1 and the brake cylinder device 2 will be at a maximum when the pressure of fluid in the brake pipe 61 is reduced to atmospheric as in effecting an emergency application of brakes. If pressure of fluid in the brake pipe 61 is reduced to atmospheric, as in an intentional emergency reduction, or in parting of the vehicle from a train either accidentally or intentionally, both the brake cylinder devices 1 and 2 will respond to apply brakes on the vehicle. Should pressure of fluid fail in the brake cylinder device 1, the brake cylinder device 2 will remain operative to hold the brakes applied. While the vehicle is parked, therefore, even though the brake cylinder device 1 should leak off, the brakes will remain applied by the brake cylinder device 2.

When the vehicle is parked and the brakes thereon are applied by brake cylinder device 2 with the pressure of fluid in chamber 30 at atmospheric pressure, and, assuming the brake cylinder device 1 to be in its release position, to release brakes on the vehicle as applied by device 2, fluid under pressure may be resupplied to said chamber 30 to cause the brake cylinder device 2 to assume its release position in which it is shown in the drawing. If, at the time that release of the brakes as applied by device 2 is desired, it is not possible to effect supply of fluid under pressure to the chamber 30 in said device, in accordance with a feature of the invention, release of the brakes may be accomplished manually in the following manner.

The lower end of portion 43 of brake cylinder lever 2 is pivotally connected by a pin 44 to the upper end of the portion 16' thereof. The portion 43 is normally prevented from pivotal movement in one direction about pin 44 by a lug 45 engaging a shoulder or shoulders 46 formed at one edge of the upper end of portion 16', and in the opposite direction by a slidable element 47 mounted in a slot 51 in the portion 43 which engages a shoulder or shoulders 48 formed at the opposite edge of the upper end of portion 16'. Both the element 47 and lug 45 are carried by the portion 43 and by their cooperation with portion 16', together with pin 44, serve to normally lock the two portions of the brake cylinder lever 3 together in aligned positions so that said portions act as a single lever during actuating by either or both of the brake cylinder devices 1 and 2.

If the brake or brakes are being held applied by the brake cylinder device 2, while the vehicle is parked for example, the lever 3, including both locked portions 43 and 16', will be held in an angular position, such as may be indicated by the dot and dash line 56, by the spring 40 acting through piston 28 and rod 38 on the push rod 36 which is disposed in an extended position. When it is desired to release the brakes manually, the slidable element 47 may be delivered an upward blow with a hammer or other suitable implement to slide it in the groove 51 in portion 43 out of engagement with the shoulder 48 of portion 16' of brake cylinder lever 3. When element 47 is thus disengaged from portion 16', said portion will then move in a counterclockwise direction about pin 19 to its release position in which it is shown in the drawing, disengaging the brake shoe 17 from the wheel, while the lower end of portion 43 will move in a clockwise direction about pin 42 carried in the end of the extended push rod 36 to a position in which it is shown in Fig. 3. At this time the element 47 will be disposed away from the lower end of groove 51, resting on the upper end of portion 16'.

When fluid under pressure is again supplied to pressure chamber 30 of the brake cylinder device 2 to return the piston 28 therein to its release position the portion 43 of brake cylinder lever 3 may be pulled back to its normal position in which it is shown in Fig. 1 in the drawing which will allow the slidable element 47 to drop to the lower end of the groove 51 in engagement with the shoulder 48 of portion 16', so that again portions 43 and 16' are locked together.

Summary

It will thus be realized that I have provided an improved fluid pressure controlled brake equipment which is particularly adapted for use in braking systems on vehicles requiring different degrees of braking for different conditions and for effecting parking thereof, and which eliminates the necessity for complicated mechanical linkages associated with the usual hand brake arrangement used for parking.

Having now described the invention, what I claim as new and desire to secure by Letters Patent, is:

1. In a fluid pressure brake equipment for a vehicle, the combination with a brake pipe, of brake cylinder means operative by fluid under pressure to apply brakes on said vehicle, brake controlling means operative upon a reduction in pressure of fluid in said brake pipe for effecting supply of fluid under pressure to said brake cylinder device, and spring means operative upon a reduction in pressure of fluid in said brake pipe also to apply said brakes and rendered ineffective upon an increase in such pressure.

2. In a fluid pressure brake equipment for a vehicle, the combination with a brake pipe, of a brake cylinder device operative by fluid under pressure to apply brakes on said vehicle, brake controlling means for controlling pressure of fluid in said brake cylinder device and operative upon an emergency reduction in pressure of fluid in said brake pipe to establish a maximum pressure of fluid in said brake cylinder device for effecting an emergency application of said brakes, and spring means operative upon said emergency reduction in brake pipe pressure to aid in effecting said emergency application of brakes.

3. In a fluid pressure brake equipment for a vehicle, the combination with a brake pipe, of a first brake cylinder device operative by fluid under pressure to apply brakes on said vehicle, brake controlling means operative upon a reduction in pressure of fluid in said brake pipe for supplying fluid under pressure to said first brake cylinder device, a second brake cylinder device comprising spring means operative upon a reduction in pressure of fluid in a chamber to apply said brakes, and means opening said chamber to said brake pipe.

4. In a fluid pressure brake equipment for a vehicle, the combination with a brake pipe normally charged with fluid under pressure, of a brake cylinder device operative upon supply of fluid under pressure thereto to effect application of brakes on said vehicle and rendered ineffective upon release of fluid under pressure therefrom, brake controlling means operative upon a reduction in pressure of fluid in said brake pipe for supplying fluid under pressure to said brake cylinder device, spring means operative upon a reduction in pressure of fluid in said brake pipe to apply said brakes, and manually operable means to effect release of said brakes when applied by said spring means alone.

5. In fluid pressure brake equipment for a vehicle, the combination with a brake pipe normally charged with fluid under pressure, of a brake cylinder lever operatively connected to brakes on said vehicle, a brake cylinder device operative upon supply of fluid under pressure thereto to apply a force to said brake cylinder lever for applying said brakes and operative upon release of said fluid under pressure therefrom to a release position for releasing said force, brake controlling means operative upon a reduction in pressure of fluid in said brake pipe to supply fluid under pressure to said brake cylinder device, spring means operative to an application position upon reduction in pressure of fluid in said brake pipe to apply a force on said lever for applying said brakes, and mechanical means associated with said lever and operable manually to effect release of said brakes with said spring means in its application position and said brake cylinder device in its release position.

6. In fluid pressure brake equipment for a vehicle, in combination, brake cylinder lever means operable to effect application of brakes on said vehicle, a fluid pressure brake applying spring releasing brake cylinder means operatively connected to said brake cylinder lever means, a spring brake applying fluid pressure releasing brake cylinder means operatively connected to said lever means, and manually operable means associated with said brake cylinder lever means to release said brakes when applied by the last named brake cylinder means.

7. In fluid pressure brake equipment for a vehicle, the combination with a brake cylinder device comprising a piston, spring means for actuating said piston, a chamber normally charged with fluid under pressure for maintaining said spring compressed, and a push rod operable to an application position by action of said spring on said piston upon release of fluid under pressure from said chamber, of brake cylinder lever means operable by said push rod to effect application of brakes on said vehicle, said brake cylinder lever means comprising mechanical means operable manually for effecting release of said brakes while said push rod remains in its application position.

WALTER B. KIRK.

REFERENCES CITED

The following references are of record in the file of this patent:

UNITED STATES PATENTS

| Number | Name | Date |
| --- | --- | --- |
| 2,270,431 | Freeman | Jan. 20, 1942 |
| 2,277,124 | Maliphant et al. | Mar. 24, 1942 |

FOREIGN PATENTS

| Number | Country | Date |
| --- | --- | --- |
| 540,921 | Great Britain | Nov. 5, 1941 |